United States Patent
Kami et al.

(10) Patent No.: US 8,101,252 B1
(45) Date of Patent: Jan. 24, 2012

(54) AIR BAG

(75) Inventors: Yoshinori Kami, Tokyo (JP); Hideaki Ishii, Ashiya (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 1772 days.

(21) Appl. No.: 09/530,447

(22) PCT Filed: Oct. 30, 1998

(86) PCT No.: PCT/JP98/04944
§ 371 (c)(1),
(2), (4) Date: Apr. 28, 2000

(87) PCT Pub. No.: WO99/22967
PCT Pub. Date: May 14, 1999

(30) Foreign Application Priority Data

Oct. 31, 1997  (JP) ....................... 9-299861
Feb. 12, 1998  (JP) ....................... 10-29849

(51) Int. Cl.
*B32B 1/00* (2006.01)
*B32B 23/00* (2006.01)

(52) U.S. Cl. ............. 428/34.1; 428/34.3; 428/34.5; 428/35.2; 428/35.3; 428/36.1; 428/375; 428/379; 428/389; 442/181; 442/208; 442/189; 442/137; 442/203; 442/224; 442/228; 442/229; 442/233; 280/728.1; 280/743.1

(58) Field of Classification Search .......... 428/34.1, 428/34.3, 34.5, 35.2, 35.3, 36.1, 375, 379, 428/389; 442/181, 208, 189, 137, 203, 224, 442/228, 229, 233; 280/728.1, 743.1
See application file for complete search history.

(56) References Cited

U.S. PATENT DOCUMENTS

| | | | |
|---|---|---|---|
| 3,705,645 A | 12/1972 | Konen | 206/46 R |
| 5,533,755 A | 7/1996 | Nelsen et al. | 280/743.1 |
| 5,584,507 A | 12/1996 | Khandhadia et al. | 280/743.1 |
| 5,637,385 A * | 6/1997 | Mizuki et al. | 442/361 |
| 5,768,875 A | 6/1998 | Bergen | 57/225 |

FOREIGN PATENT DOCUMENTS

| | | |
|---|---|---|
| JP | 9-078392 | 3/1897 |
| JP | 6-8779 | 1/1994 |
| JP | 7-054238 | 2/1995 |
| JP | 7-90747 * | 4/1995 |
| JP | 7-300054 | 11/1995 |
| JP | 8-501517 | 2/1996 |
| WO | WO 93/15138 | 8/1993 |
| WO | WO 94/21494 | 9/1994 |
| WO | WO 95/00366 | 1/1995 |

* cited by examiner

*Primary Examiner* — Marc Patterson
(74) *Attorney, Agent, or Firm* — Finnegan, Henderson, Farabow, Garrett & Dunner, L.L.P.

(57) ABSTRACT

An air bag which is light and pliable to be compactly housed and excellent in durability against a load applied thereto, upon the actuation of air bag, and long term aging, which is formed of two woven fabrics interwoven with each other to be a bag-shaped body, each composed of polyamide type synthetic fiber yarns containing copper compounds in a range from 30 to 200 ppm estimated in term of copper or cut pieces of the fabric sewn together to be a three-dimensional shape, the fabric having a product of a total fineness of warp or weft multiplied by a weave density of 16000 decitex·ends/2.54 cm or less, a load at 15% elongation in a range from 3 to 35 N/%/2.54 cm and a tensile work at break in a range from 7000 to 30000 N·%/2.54 cm.

This air bag may be applicable to a driver's seat, a passenger's seat, and to side impact protection in a vehicle.

12 Claims, 2 Drawing Sheets

(1)

(2)

(3)

(4)

(5)

(6)

AIR BAG

FIELD OF THE INVENTION

The present invention relates to an air bag for the protection of vehicle occupants upon the collision of a vehicle, by preventing the car occupants from secondarily colliding with an interior structure of the vehicle.

PRIOR ART

Recently, air bags have been increasingly mounted to various transportation means, and especially to automobiles for the purpose of protecting occupants thereof.

The air bag is usually housed in a narrow space such as an interior space of a steering wheel or an instrument panel. Nowadays, the steering wheel is designed to have a larger opening so that a speedometer or other instruments is easily visible, which, however, strongly requires that the air bag has a volume as small as possible to be housed in such a steering wheel.

It is important that a woven fabric for an air bag has an excellent mechanical property and is durable against the deployment of the air bag caused by a sudden expansion of a gas and a good foldability so that the air bag is foldable as compact as possible to be housed in a mounting case. Efforts to obtain such an air bag excellent in mechanical performance and having a compact volume, are continuing.

A prior art air bag is generally prepared from a woven fabric composed of polyamide type yarns to have a weave density in a range from 24 to 32 ends/2.54 cm if a total yarn fineness is 933 decitex or in a range from 46 to 55 ends/2.54 cm if a total yarn fineness is 467 decitex, which fabric is then coated with a synthetic rubber such as chloroprene rubber or silicone rubber and sewn together to form the air bag.

The coated fabric, however, is thick and heavy and, in addition, has a high rigidity, whereby the air bag formed of such a fabric may injure a vehicle occupant when an air bag device operates to deploy and inflate the air bag. There are reports that this is particularly dangerous when the vehicle occupant is an infant.

The air bag device is usually mounted to a central region of a steering wheel for a driver's seat and to an inner wall of an instrument panel for a passenger's seat. If the air bag is heavy in weight, it is necessary to strengthen a mount thereof so that the mount can bear the weight.

Also, if the woven fabric for the air bag has a large thickness and a high rigidity, the volume of the folded air bag becomes larger to need a larger space therefor.

To eliminate such drawbacks, woven fabrics having no resinous coating have recently been used. Alternatively, some air bags use a woven fabric composed of thinner yarns such as one having a fineness of 350 decitex or 233 decitex. The air bags obtained from such woven fabrics, however, are insufficient for the reduction of the fabric thickness and weight, and therefore there is still a strong desire for obtaining a lighter and more pliable fabric.

Under these circumstances, U.S. Pat. No. 5,533,755 proposes an inflatable protective cushion (air bag) using a woven fabric composed of yarns having a fineness less than 467 decitex. An air cushion is disclosed as Example 1 thereof formed of a woven fabric composed of nylon yarns of 50 decitex which is compacted through a special scour and then calendered. While the fabric of this kind certainly has a much smaller fabric thickness and weight relative to the prior art woven fabric, usually the tensile strength thereof is also reduced to the same extent. Accordingly, there is a risk in that the air bag is not durable against stress and/or an inner pressure generated upon inflation and deployment of the air bag unless it is converted to a specially strengthened fabric through a compaction treatment or a calendering as disclosed in the above-mentioned United States Patent. The United States Patent also proposes, in addition to the strengthening of the fabric described above, the improvement in a cut shape and a position of seams of the air bag fabric. For example, it is usual in the conventional air bag for a driver's seat that two circular pieces of about 70 cm diameter are cut from the fabric and sewn together along the periphery thereof. Contrarily, according to the United States Patent, it is proposed that a square piece of fabric is folded so that four corners are located at a center of the fabric piece and edges of adjacent folded flap portions are sewn together to form the air bag. By doing so, a tensile strength of the air bag is improved because no seam is present in a region in which the maximum stress might generate upon the inflation of the air bag. While this proposal is certainly effective for increasing a resistance to pressure of the air bag, it is apparent that the air bag is of a square shape like a cushion, which is defective because of the presence of corners as well as the difficulty of automating the sewing operation.

DISCLOSURE OF THE INVENTION

The present invention is directed to an air bag free from the above-mentioned problems, which is light in weight and is compact to be housed in an air bag case, while having properties satisfying the necessary and sufficient conditions upon the actuation of air bag as well as being durable against long term aging.

As stated above, to achieve the weight reduction and compactness which are essential requisites for an air bag, in place of a woven fabric composed of yarn having a fineness level of 467 decitex order which has typically been used, trials for adopting a woven fabric composed of yarns having a fineness of 350 decitex have been carried out by some manufacturers of air bags. However, the fabric and the air bag resulted from thinner yarns are insufficient in fabric thickness and weight. For instance, a typical woven fabric used which is composed of nylon 66 yarns of 467 decitex to have a weave density of 53 ends/2.54 cm has a fabric thickness of 0.32 mm and a basis weight of 204 g/m$^2$, while another woven fabric composed of nylon 66 yarns of 350 decitex to have a weave density of 60 ends/2.54 cm has a fabric thickness of 0.28 mm and a basis weight of 170 g/m$^2$, which means that even if the yarn fineness decreases from 467 decitex to 350 decitex, the reduction of the fabric thickness is at most about 13% and that of the weight is about 17%. The air bag for a driver's seat formed of such a fabric has a weight exceeding about 200 g and a thickness in a folded state exceeding about 20 mm.

The present invention has been based on a view that for the purpose of drastically reducing weight and volume of an air bag, it is necessary to decrease the basis weight and thickness of a woven fabric used therefor by about 20%, preferably by 30% or more.

To achieve the above-mentioned object of the present invention, the present inventors have paid attention to a dynamic load applied to the air bag at each of the operating stages and found that the tenacity of the air bag; i.e., the performance thereof durable against dynamic stress relies not only on a mechanical strength of a fabric forming the air bag but that the amount of a tensile work at break of the fabric forming the air bag is also an extremely important factor.

According to one aspect of the present invention, an air bag formed of two woven fabrics interwoven with each other to be a bag-shaped body, each composed of polyamide type fiber yarns containing copper compounds at 30 to 200 ppm estimated in terms of copper is provided, wherein the fabric is structured so that a product of a total fineness of warp or weft of the fabric multiplied by a weave density of the fabric is not more than 16000 decitex·ends/2.54 cm, a load at a 15% tensile elongation is in a range from 3 to 35 N/%/2.54 cm, and a tensile work at break is in a range from 7000 to 30000 N·%/2.54 cm. According to another aspect of the present invention, an air bag formed of a woven fabric composed of polyamide type fiber yarns containing copper compounds at 30 to 200 ppm, estimated in term of copper, is provided, wherein the fabric has a product of a total fineness of warp or weft of the fabric multiplied by a weave density of the fabric of not more than 16000 decitex·ends/2.54 cm, a load at a 15% elongation in a range from 3 to 35 N/%/2.54 cm, and a tensile work at break in a range from 7000 to 30000 N·%/2.54 cm, and wherein the fabric is sewn or bonded to have a three-dimensional contour.

The present invention will be described in more detail below.

Air bags according to the present invention are those formed of two woven fabric pieces, each composed of polyamide type synthetic fiber yarns, to be a bag-shaped body. They include air bags for a driver's seat, for a passenger's seat and for side impact protection of a vehicle occupant.

According to the present invention, the bag-shaped body may be prepared by sewing or bonding two fabric pieces together or may be woven into a fabric and cut therefrom.

The air bag formed of two woven fabrics of the present invention may be a bag-shaped body which is manufactured by sewing two fabrics having the same weave or different weaves or one woven on a loom as a hollow weave while using a stitch yarn. If the hollow air bag is formed of the above-mentioned fabrics satisfying the conditions defined by the specified yarn, weave structure and tensile work at break, it is possible for the woven fabric to generally uniformly bear an expansion stress caused by a gas generated upon the deployment of the air bag, whereby the air bag could, as a whole, have an extremely high mechanical resistance to an instantaneous expansion stress upon deployment.

Also, the air bag according to the present invention may be formed by sewing or bonding one or three cut pieces, or more, of the above-mentioned woven fabric together to have a three-dimensional contour. The above-mentioned air bag formed by sewing or bonding one or three cut pieces, or more, of the woven fabric to have a three-dimensional contour may be the one disclosed in Japanese Patent No. 2,668,332 wherein three main pieces of the fabric are cut from a woven fabric and then sewn together along the outer periphery to have a three-dimensional contour, or may be one disclosed in U.S. Pat. No. 5,529,340 wherein a single piece is cut from a woven fabric, which is patterned to have a three-dimensional contour after the cut edges thereof are sewn together.

The air bag according to the present invention is excellent in weight reduction and pliability so that a favorable compactness is obtainable if the fabric is composed of yarns (warp and weft), each consisting of a plurality of filaments having a total fineness in a range from 66 to 167 decitex and a single filament fineness in a range from 1.0 to 3.3 decitex, and has the above-identified tensile work at break. Also, a resistance to heat-aging, a resistance to wet heat-aging and a resistance to ozone of the air bag could be improved to a large extent if a woven fabric composed of polyamide fiber yarns containing a predetermined amount of copper salt (copper acetate, halogenated copper, copper bromide or others), halogenated alkaline metals or mixtures of various copper salts and organic bases is used.

BEST MODES FOR CARRYING OUT THE INVENTION

Figure 2:
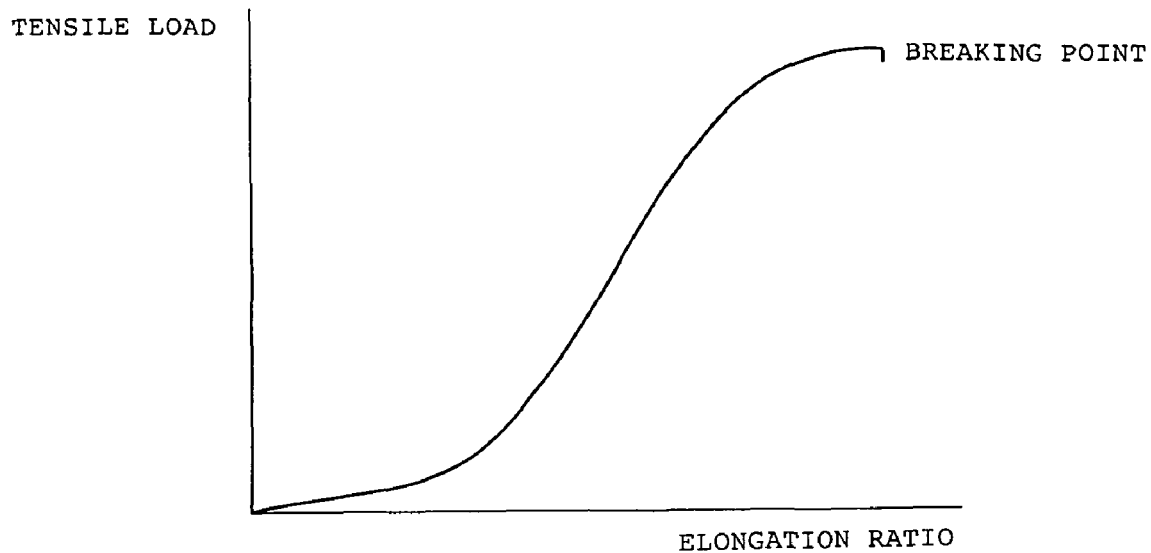
FIG. 2 is a tensile stress-strain curve of a woven fabric constituting the air bag, for illustrating a tensile work at break thereof.

According to the present invention, it is necessary that an air bag is formed of a woven fabric having a tensile work at break of 7000 (N·%/2.54 cm) or more. The tensile work at break referred to in this text is defined by an area encircled with a tensile stress-strain curve shown in FIG. 2 of the woven fabric of the air bag obtained by a tensile test carried out under a predetermined condition and a vertical line extending from a break point on the tensile stress-strain curve to a horizontal axis (representing a tensile elongation).

Figure 1:
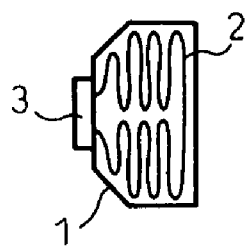
FIG. 1 is a conceptual illustration of a sequence of behaviours of an air bag upon the inflation.
Figure 1:
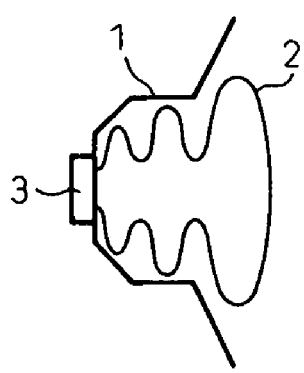
Figure 1:
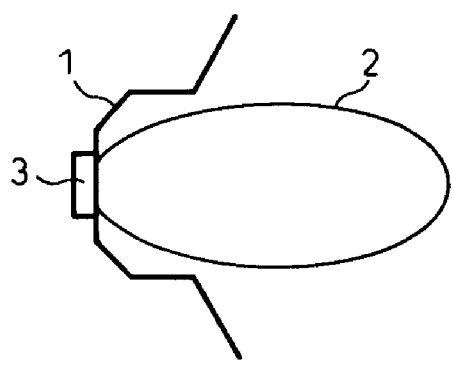
Figure 1:
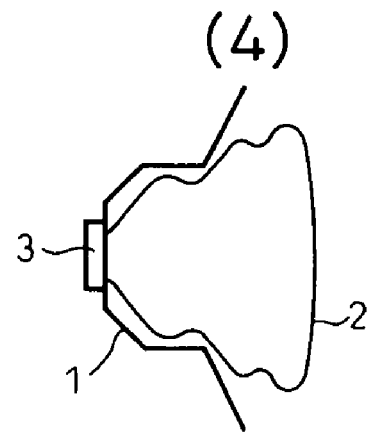
Figure 1:
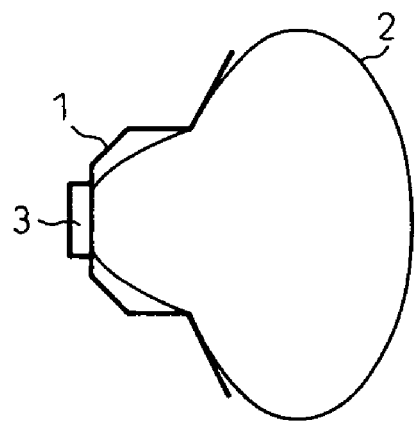
Figure 1:
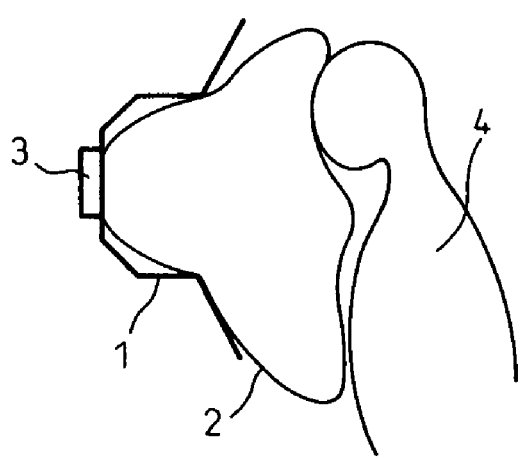

With reference to FIG. 1, the tensile work at break will be explained below.

FIG. 1 is a schematic illustration of a sequence of typical behaviours of the air bag upon the collision of a vehicle. FIG. 1(1) shows the air bag housed in a case 1 in a folded state before the same is actuated. When the vehicle collision occurs and a signal is transmitted from a sensor to the gas generator (inflator), a gas for inflating the air bag 2 is supplied thereinto. Then the case opens as shown in FIG. 1(2) to allow the air bag to project forward (in the direction opposite to the mount). After the air bag vibrates forward and backward due to the elastic recovery of the woven fabric and the inner pressure as shown in FIGS. 1(3) and 1(4), the air bag expands to a maximum extent and reaches a generally stable profile. According to the actuation test for the air bag carried out at a standard collision speed, for example, defined by FMVSS208 which is a vehicle safety regulation in the United States, when the air bag reaches the state shown in FIG. 1(5), the occupant 3 pushes the air bag as shown in FIG. 1(6) to exhaust gas through a vent provided in the air bag. Thus, the inertial kinetic energy of the occupant caused by a sudden stop of the vehicle is absorbed by the air bag so that the impact is cushioned.

In the above sequence of the actuation of the air bag, at the stage shown in FIGS. 1(5) and 1(6), a load applied to the woven fabric of the air bag is a hoop tension due to the inner pressure of the air bag wherein, assuming that the air bag is of a spherical shape, a stress (f) generated in the woven fabric is represented by an equation f=pd/4 where p is the inner pressure and d is a diameter of the air bag, which means that the tensile strength of the woven fabric is a decisive factor for determining the tenacity of the air bag. Contrarily, at the stage shown in FIG. 1(3) wherein gas flows into the air bag upon the actuation of the inflator to project the air bag forward to a maximum extent, the forward motion of the air bag ceases when the kinetic energy of the air bag itself is absorbed by the tensile work of the woven fabric. Accordingly, at this stage, the tensile work at break of the woven fabric forming the air bag is more decisive than the tensile strength at break thereof.

The present inventors have analyzed the sequence of behaviours of the air bag from the stage wherein the air bag starts the inflation to the stage wherein the inflated air bag absorbs the inertial kinetic motion of the vehicle occupant caused by a sudden stop of the vehicle, and found that the dynamic load applied to the air bag becomes larger at the stage shown in FIG. 1(3) wherein the air bag is supplied with gas from the inflator to project forward to a maximum extent than at the stage shown in FIGS. 1(5) and 1(6) wherein the air bag inflates to a maximum extent and restrains the occupant.

Since the kinetic energy of the air bag projected forward must be absorbed by the tensile work of the woven fabric forming the air bag at the former stage as described above, the woven fabric of the air bag preferably has a larger tensile work.

According to the present invention, it is necessary that the tensile work at break of the woven fabric is 7000 (N·%/2.54 cm) or more, preferably 15000 (N·%/2.54 cm) or more, most preferably 25000 (N·%/2.54 cm) or more if the deployment at a high temperature or a safety factor is taken into consideration. If this value is less than 7000 (N·%/2.54 cm), there is a risk in that the air bag may be broken in the mount or the outer periphery thereof at the deployment stage of the air bag.

This tensile work is generally correlated to a basis weight of the woven fabric if a yarn kind is specified. Therefore, an unnecessarily large tensile energy at break is contradictory, as a result to the weight reduction and compactness which are important requisites for the air bag. For such reasons, the air bag according to the present invention has to be formed of a woven fabric having a product of a total fineness of warp or weft multiplied by a weave density (hereinafter referred to as a weave fineness) of 16000 (decitex·ends/2.54 cm) or less and a tensile work at break of 7000 (N·%/2.54 cm) or more.

Also, according to the present invention, it is effective that a load at a 15% elongation is in a range from 3 to 35 N/%/2.54 cm when the woven fabric is stretched. If the load at a 15% elongation exceeds 35 N/%/2.54 cm, the woven fabric is too rigid to obtain a pliable air bag. Contrarily, if it is less than 3 N/%/2.54 cm, the woven fabric is liable to be largely stretched to cause a so-called bottoming when the air bag restrains the vehicle occupant.

Since the vehicle may be used under various conditions for a long period, one of important requisites for the air bag is that the performance thereof does not deteriorate even after being exposed to high temperature, moisture or ozonic. Particularly, the resistance to heat is an important factor. Actually, automobile manufacturers regard such a fact as important as the loss of the tensile strength of the woven fabric is small after being subjected to a high temperature (in a range from 80 to 120° C.) treatment for a long period (in a range from 1000 to 3000 hours).

To obtain an air bag according to the present invention light in weight and excellent in pliability and compactness, it is preferable that yarns are used for forming the woven fabric for the air bag have a total yarn fineness in a range from 66 to 167 decitex and are composed of a plurality of single filaments, each having a fineness in a range from 1.0 to 3.3 decitex. If the yarns having a total yarn fineness exceeding 167 decitex or a single filament fineness exceeding 3.3 decitex, are used, the resultant woven fabric becomes stiff and produces an air bag having poor stowability. Contrarily, yarns having a single filament fineness less than 1.0 decitex are difficult to produce and, even if it is possible, the weaving process would be troublesome. The air bag obtained from yarns having a total thickness less than 66 decitex has an inferior mechanical property such as a tensile strength or a tearing strength and may not satisfy the indispensably dynamic characteristics of the air bag indispensable upon the actuation thereof.

The woven fabric for the air bag according to the present invention preferably has substantially the same mechanical property in the warp and weft directions. The mechanical property in the weft direction, however, is sometimes inferior to that in the warp direction as a result of the treatment direction in a fabric finishing process. To solve this problem, according to the present invention, the woven fabric is preferably prepared so that a birefringence of weft is larger than that of warp, or a weave fineness in weft is larger than that in warp in the resultant fabric.

Additives for facilitating the yarn durability are seldom added to polyamide fibers for ordinary clothing use. However, since the durability, particularly the resistance to heat is one of important requisites for the air bag as described before, yarns for the air bag according to the present invention must contain one kind or more stabilizing agents for improving the durability. The durability referred to herein includes a resistant to aging, a resistant to wet heat aging, a resistance to ozone or others.

In the present invention, yarn forming the woven fabric contains a copper compound selected from a group consisting of copper salt and a halogenated copper in a mixture with a halogenated alkaline metal as the stabilizing agents for improving the heat durability. The copper salt includes, for example, copper acetate, and the halogenated copper includes, for example, copper bromide. These copper compounds may be added to polymide fibers in a known manner, such as added in a polymerization process of polyamide or incorporated into polymer chips.

Yarns forming the air bag of the present invention are composed of polyamide fibers containing copper or copper compounds of 30 to 200 ppm estimated in term of copper. If the value estimated in term of copper is less than 30 ppm, there is a risk of a lack of the heat durability expected of the air bag fabric of the present invention, while if it exceeds 200 ppm, there is a risk of difficulty in the spinning process.

The air bag fabric of the present invention may be woven in any of conventional weaves including a plain weave, a ripstop weave, a mat weave, a twill weave or others. However, a plain weave is particularly favorably used for the air bag fabric according to the present invention, because a denser weave structure is easily obtainable. The warp and weft density may be adjustable even after the weaving process through the fabric finishing process. The air bag of the present invention may be manufactured by a conventional air bag-forming method.

While constituent features of the air bag according to the present invention have been described above mainly with reference to an air bag for a driver's seat, these means and methods may be also applicable in a similar manner to that for a passenger's seat or a side impact protection air bag. This is apparent because, even though a bag structure and shape, a deployment speed and a mounting position are different from the former, the deployment kinetic energy of the air bag itself is absorbed by a tensile work of the woven fabric. The air bag may be coated with synthetic rubber or others, or may be of a so-called non-coated type.

EXAMPLES

The present invention will be described more concretely below with reference to the preferred examples and comparative examples. The definition and measurement of yarns and fabrics in the examples and comparative examples are as follows. In this respect, the specification, physical property and performance of the yarns and fabric in the example and comparative examples are described in Tables 1 and 2, respectively.

(a) Tensile Strength, Tensile Elongation at Break and Tensile Work at Break of Yarn The yarn tensile strength and elongation at break were measured by an Autograph S-100 Type manufactured by Shimadzu Seisakusho K.K. under the condition of a grip yarn length of 20 cm and a stretching speed of 20 cm/min. The tensile work at break was an integrated value from the initiation to a breakage point in a tensile stress-strain curve obtained by this measurement divided by a measured yarn fineness and unit-converted to cN·cm/decitex.

(b) Birefringence of Yarn

The measurement was carried out by means of a polarizing microscope of the XTP-11 type manufactured by Nikon K.K., wherein a conventional Bereck compensator method is adopted while using white light as a light source.

(c) Tensile Strength, Tensile Elongation at Break, Tensile Work at Break and Retention of Resistance to Heat of Fabric The fabric tensile strength and elongation at break were measured by an AG 1000D manufactured by Shimadzu Seisakusho K.K., under the condition of a test piece width of 2.54 cm, a fabric grip length of 20 cm and a stretching speed of 20 cm/min while adopting a raveled-strip method. The tensile work at break was an integrated value from the initiation to a breakage point in a tensile stress-strain curve obtained by this measurement divided by the fabric grip length and unit-converted to N·%/2.54 cm. A load at 15% elongation is a load value at 15% on the tensile stress-strain curve obtained by this measurement, which is then divided by 15 and unit-converted to N/%/2.54 cm. The retention of resistance to heat was calculated by dividing a tensile strength value obtained in the above manner prior to a heat treatment of the fabric (at 110° C. for 1000 hours) with a value after the heat treatment.

(d) Measurement of Air Bag Thickness

Figure 3:
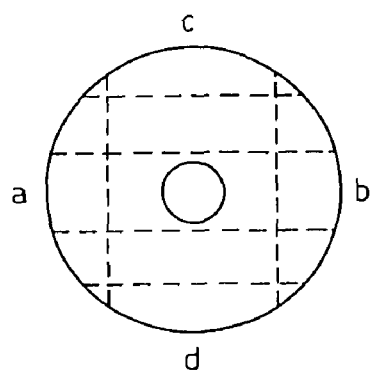
FIG. 3 is an illustration of a method for measuring a thickness of the air bag.
Figure 3:
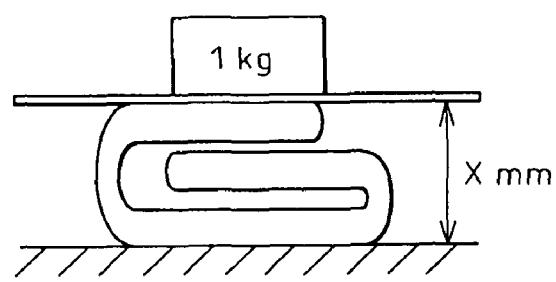

As shown in FIG. 3(A), the air bag was first folded so that edges a and b are brought into contact with each other, and then folded so that a distance between edges c and d is equally divided. The folded air bag shown in FIG. 3(B) was placed on a flat table and loaded with a weight of 1 kg via a glass plate of 300 mm square. After 30 minutes, a thickness X was measured. The measured value is divided by an X value of an air bag in Comparative Example 4 which corresponds to a prior art one and shown in a Table.

Example 1

Polyhexamethylene adipamide chips having a relative viscosity of 60 relative to 90% formic acid were molten in an extruder type spinning machine. The chips had no titanium oxide but contained copper acetate and potassium iodide of 1:12 in an additive ratio as a copper type heat-stabilizing agent so that copper is contained at 65 ppm in the polymer. The molten polymer was filtered and extruded from a spinneret having nozzles of 0.25 mm diameter. The extruded molten polymer was quenched and solidified into a fibrous yarn, to which is imparted an oil at 1.0% by weight. The yarn was taken up by a takeup roll and immediately thereafter passed to a hot roll for the purpose of carrying out the drawing operation between both the rolls. These steps were continuously carried out by a direct spin-draw machine. The yarn was subjected to an interlacing treatment immediately before being wound on a bobbin at a winding speed of 4000 m/min to have interlaced portions in a range from 10 to 30 points/m. The resultant polyhexamethylene adipamide yarn has a yarn fineness of 78 decitex/35 filaments, a tensile strength of 7.1 cN/dtex, a tensile work at break of 16.3 cN·cm/decitex and a birefringence of 56 Δn/1000.

Then, a greige fabric was woven from the yarns thus obtained, wherein warp was prepared by doubling two of the yarns at a twist of 200 turns/m and sizing with acrylic sizing agent, while weft is inserted into the same shedding. The greige was scoured and set to result in an air bag fabric having a weave density in warp of 95 and in weft of 93 ends/2.54 cm estimated in term of 156 decitex, a weave fineness of 14820 decitex·ends/2.54 cm in warp and 14508 decitex·ends/2.54 cm in tensile work at break in warp of 20500 and in weft of 13500 N·%/2.54 cm. Two circular pieces of 648 mm for an air bag body and other two circular pieces of 230 mm diameter as an reinforcement cloth for the air bag-mount were cut from the fabric, the former being sewn together along the outer periphery thereof while added with the latter (with a sewing thread #20 by a double chain stitch) to form an air bag of 60 l for a driver's seat.

The air bag was compactly foldable. The deployment test was carried out at 85° C. while mounting thereto an inflator (Type 8) manufactured by Morton International, which showed that no damage occurs to the air bag.

Also, the woven fabric was subjected to a heat treatment at 110° C. for 1000 hours, and thereafter the retention of strength was measured. The value obtained was 95% which means that a resistance to heat is sufficient.

Example 2

Yarns having a tensile strength of 6.3 cN/decitex and a tensile work at break of 23.9 cN·cm/decitex were prepared in the same manner as in Example 1. A fabric having a tensile work at break in warp of 20600 and in weft of 14500 N·cm/decitex was woven from the yarns in the same manner as in Example 1.

Two circular pieces of 648 mm diameter were cut from the fabric, from which an air bag of 60 l for a driver's seat was prepared by sewing the outer periphery thereof while adding reinforcement pieces thereto in the same manner as in Example 1.

The air bag was compactly foldable. The deployment test was carried out at 85° C. while mounting thereto an inflator (Type 8) manufactured by Morton International, which showed that no damage occurs to the air bag.

Example 3

Yarns having a tensile strength of 5.4 cN/decitex and a tensile work at break of 26.0 cN·cm/decitex were prepared in the same manner as in Example 1. A fabric having a tensile work at break in warp of 17500 and in weft of 13600 N·cm/dTex was woven from the yarns in the same manner as in Example 1.

Two circular pieces of 648 mm diameter were cut from the fabric, from which an air bag of 60 l for a driver's seat was prepared by sewing the outer periphery thereof.

The air bag was compactly foldable. The deployment test was carried out at 85° C. while mounting thereto an inflator (Type 8) manufactured by Morton International. As a result, it was confirmed that no damage occurs to the air bag upon deployment.

Example 4

A fabric was woven from yarns prepared in Example 1 to have a weave density in warp of 90 and in weft of 98 ends/2.54 cm. This fabric was a balanced one having tensile strength in warp of 963 N/2.54 cm and in weft of 983 N/2.54 cm.

Two circular pieces of 648 mm diameter were cut from the fabric, from which an air bag of 60 l for a driver's seat was prepared by sewing the outer periphery thereof.

The air bag was compactly foldable. The deployment test was carried out at 85° C. while mounting thereto an inflator (Type 8) manufactured by Morton International, which showed that no damage occurs to the air bag.

Example 5

Yarns having a tensile strength of 6.7 cN/decitex and 7.1 cN/decitex were prepared in the same manner as in Example 1, and a fabric having a weave density both in warp and weft of 94 ends/2.54 cm was woven therefrom, which had a balanced tensile strength both in warp and weft; i.e., that in warp being 951 and that in weft being 941 N/2.54 cm.

Two circular pieces of 648 mm diameter were cut from this fabric, from which an air bag of 60 l for a driver's seat was prepared by sewing the outer periphery thereof in the same manner as in Example 1.

The air bag was compactly foldable. The deployment test was carried out at 85° C. while mounting thereto an inflator (Type 8) manufactured by Morton International, which showed that no damage occurs to the air bag.

Example 6

Yarns were prepared in the same manner as in Example 1. A fabric was woven from these single yarns without doubling the same so that a weaving density is 142 ends/2.54 cm both in warp and weft, a weave fineness is 11076 decitex·ends/2.54 cm and a tensile work at break is 12500 N·%/2.54 cm in warp and 8000 N·%/2.54 cm in weft.

Two circular pieces of 648 mm diameter were cut from the fabric, from which an air bag of 60 l for a driver's seat was prepared by sewing the outer periphery thereof in the same manner as in Example 1.

The air bag was compactly foldable. The deployment test was carried out at 85° C. while mounting thereto an inflator manufactured by Morton International, which showed that no damage occurs to the air bag.

Comparative Example 1

A fabric was woven in the same manner as in Example 1 from yarns prepared in the same manner as in Example 1 except that no copper compounds were added to the polymer. A retention of a resistance to heat of this fabric was as low as 48%.

Comparative Example 2

A fabric was woven in the same manner as in Example 1 from yarns prepared in the same manner as in Example 1 except that copper compounds of 10 ppm estimated in term of copper were added to the polymer. A retention of a resistance to heat of this fabric was as low as 70%.

Comparative Example 3

Yarns having a fineness of 56 decitex were prepared in the same manner as in Example 1, and a fabric was woven from the yarns thus prepared, which had a weave density in warp of 192 and in weft of 190 ends/2.54 cm, and a tensile work at break in warp of 6000 and in weft of 5900 N·%/2.54 cm.

Two circular pieces of 648 mm diameter were cut from the fabric, from which an air bag of 60 l for a driver's seat was prepared by sewing the outer periphery thereof in the same manner as in the Example.

The air bag was compactly foldable. The deployment test carried out at 85° C. while mounting thereto an inflator (Type 8) manufactured by Morton International, however, showed that the air bag was seriously damaged.

Comparative Example 4

Yarns having a fineness of 233 decitex were prepared in the same manner as in Example 1, and a fabric was woven from the yarns, thus prepared, which had a weave density in warp of 78 and in weft of 75 ends/2.54 cm, and a tensile work at break in warp of 30000 and in weft of 26000 N·%/2.54 cm.

Two circular pieces of 648 mm diameter were cut from the fabric, from which an air bag of 60 l for a driver's seat was prepared by sewing the outer periphery thereof in the same manner as in Example 1.

The deployment test carried out at 85° C. while mounting thereto an inflator (Type 8) manufactured by Morton International showed that the air bag was not damaged but difficult to fold, in comparison with the air bags of Examples 1 to 6, and had a large volume in the folded state.

TABLE 1

| | | Example 1 | Example 2 | Example 3 | Example 4 | Example 5 | Example 6 |
|---|---|---|---|---|---|---|---|
| Polymer | Description | Polyamide | Polyamide | Polyamide | Polyamide | Polyamide | Polyamide |
| | Relative viscosity to formic acid | 60 | 60 | 60 | 60 | 60 | 60 |
| | Addition amount of titanium oxide (ppm) | 0 | 0 | 0 | 0 | 0 | 0 |
| | Addition amount of copper (ppm) | 65 | 65 | 65 | 65 | 65 | 65 |
| Yarn | Fineness of yarn (dTex) | 78 | 78 | 78 | 78 | 78 | 78 |
| | Number of filament | 35 | 35 | 35 | 35 | 35 | 35 |
| | Tensile strength (cN/dTex) | 7.1 | 6.3 | 5.4 | 7.1 | 6.7 × 7.1 | 7.1 |
| | Elongation at break (%) | 22 | 24 | 37 | 22 | 25 × 22 | 22 |
| | Tensile work at break (cN · cm/dTex) | 16.3 | 23.9 | 26.0 | 16.3 | 19.8 × 16.3 | 16.3 |
| | Birefringence ($\Delta n \times 10^3$) | 56 | 54 | 53 | 56 | 54 × 56 | 56 |
| Fabric | Fineness of yarn (warp × weft) (dTex) | 78/2 × 78/2 | 78/2 × 78/2 | 78/2 × 78/2 | 78/2 × 78/2 | 78/2 × 78/2 | 78/1 × 78/1 |

TABLE 1-continued

|  |  | Example 1 | Example 2 | Example 3 | Example 4 | Example 5 | Example 6 |
|---|---|---|---|---|---|---|---|
|  | (Total Fineness of yarn) (dTex) | 156 × 156 | 156 × 156 | 156 × 156 | 156 × 156 | 156 × 156 | 78 × 78 |
|  | Weave density (end or picks/2.54 cm) | 95 × 93 | 95 × 93 | 95 × 93 | 90 × 98 | 94 × 94 | 142 × 142 |
|  | Weave Fineness of yarn (dTex end/2.54 cm) | 14820 × 14508 | 14820 × 14508 | 14820 × 14508 | 14040 × 15288 | 14664 × 14664 | 11076 × 11076 |
|  | Thickness (mm) | 0.198 | 0.198 | 0.198 | 0.197 | 0.197 | 0.158 |
|  | Basis of Weight (g/m$^2$) | 125 | 125 | 125 | 125 | 125 | 94 |
|  | Tensile strength (N/2.54 cm) | 1010 × 930 | 900 × 850 | 770 × 740 | 963 × 983 | 951 × 941 | 760 × 740 |
|  | Elongation at breaks (%) | 35 × 27 | 45 × 34 | 54 × 43 | 35 × 27 | 40 × 27 | 37 × 26 |
|  | Load at 15% elongation (N/%/2.54 cm) | 16 × 14 | 12 × 14 | 13 × 14 | — | — | 8 × 16 |
|  | Tensile work at break (N · %/2.54 cm) | 20500 × 13500 | 20600 × 14500 | 17500 × 13600 | 17800 × 14900 | 20500 × 14000 | 12500 × 8000 |
|  | Retention of resistance to heat (%) | 95 | 95 | 95 | 95 | 95 | 95 |
| Air bag | Compactness | 0.81 | 0.81 | 0.81 | 0.83 | 0.80 | 0.75 |
|  | Result of deployment test | Not broken | Not broken | Not broken | Not broken | Not broken | Not broken |

Note: X denotes that values in warp and weft are shown.

TABLE 2

|  |  | Comparative Example 1 | Comparative Example 2 | Comparative Example 3 | Comparative Example 4 |
|---|---|---|---|---|---|
| Polymer | Description | Polyamide | Polyamide | Polyamide | Polyamide |
|  | Relative viscosity to formic acid | 60 | 60 | 45 | 80 |
|  | Addition amount of titanium oxide (ppm) | 0 | 0 | 0 | 20 |
|  | Addition amount of copper (PPm) | 0 | 10 | 70 | 70 |
| Yarn | Fineness of yarn (dTex) | 78 | 78 | 56 | 233 |
|  | Number of filament | 35 | 35 | 34 | 35 |
|  | Tensile strength (cN/dTex) | 7.0 | 6.3 | 5.4 | 7.1 |
|  | Elongation at break (%) | 22 | 24 | 37 | 22 |
|  | Tensile work at break (cN · cm/dTex) | 16.3 | 16.4 | 26.8 | 17.3 |
|  | Birefringence (Δn × 10$^3$) | 56 | 56 | 53 | 57 |
| Fabric | Fineness of yarn (warp × weft) (dTex) | 72/2 × 78/2 | 78/2 × 78/2 | 56/1 × 56/1 | 233/1 × 233/1 |
|  | (Total Fineness of yarn) (dTex) | 156 × 156 | 156 × 156 | 56 × 56 | 233 × 233 |
|  | Weave density (end or picks/2.54 cm) | 95 × 93 | 95 × 93 | 192 × 190 | 78 × 75 |
|  | Weave Fineness of yarn (dTex end/2.54 cm) | 14820 × 14508 | 14820 × 14508 | 10752 × 10640 | 18174 × 17475 |
|  | Thickness (mm) | 0.198 | 0.198 | 0.130 | 0.230 |
|  | Basis of Weight (g/m$^2$) | 125 | 125 | 92 | 152 |
|  | Tensile strength (N/2.54 cm) | 998 × 872 | 1000 × 871 | 564 × 559 | 1326 × 1275 |
|  | Elongation at breaks (%) | 16 × 15 | 16 × 14 | 7 × 17 | 20 × 30 |
|  | Load at 15% elongation (N/%/2.54 cm) | 35 × 26 | 36 × 26 | 25 × 25 | 32 × 30 |
|  | Tensile work at break (N · %/2.54 cm) | 20000 × 12000 | 20500 × 12000 | 6000 × 5900 | 30000 × 26000 |
|  | Retention of resistance to heat (%) | 48 | 70 | — | — |
| Air bag | Compactness | 0.81 | 0.81 | 0.70 | 1.00 |
|  | Result of deployment test | Broken | Broken | Broken | Not broken |

Capability of Exploitation in Industry

The present invention provides an air bag which is very exceptionally light and pliable to be compactly housed in a air bag case, having a performance necessary and sufficient for the actuation of the air bag and excellent in durability against aging in the long term. The air bag according to the present invention is suitable for all kinds of air bags for protecting a vehicle occupant including those for a driver's seat, a passenger's seat and a side impact protection which have exceptionally light weight and good performance in use.

The invention claimed is:

1. An air bag formed of two woven fabrics interwoven with each other to be a bag-shaped body, each composed of polyamide fiber yarns containing a copper compound in a mixture of a halogenated alkali metal, the copper compound selected from a group consisting of a copper salt and a halogenated copper, and having a copper concentration in the range of 30 to 200 ppm, and the polyamide fiber yarns having a total fineness in the range of from 66 decitex to 167 decitex and the yarn containing a plurality of single filaments, each filament having a fineness in the range of 1 to 3.3 decitex, wherein the product of fineness of the warp or weft of the fabric multiplied by the weave density of the fabric being not more than 16000 decitex·end or pick, respectively, /2.54 cm, the fabric having the load at 15% tensile elongation in the range of 3 to 35 N/%/2.54 cm, the tensile work at break in the range of 7000 to 30000 N·%/2.54 cm, and a value of fabric strength at break in a range from 740 to 1010 N/2.54 cm.

2. An air bag formed of a woven fabric composed of polyamide fiber yarns containing a copper compound in a mixture of a halogenated alkali metal, the copper compound selected from a group consisting of a copper salt and a halogenated copper, and having a copper concentration in the range of 30 to 200 ppm, and the polyamide fiber yarns having a total fineness in the range of from 66 decitex to 167 decitex and the yarn containing a plurality of single filaments, each filament having a fineness in the range of 1 to 3.3 decitex, wherein the product of fineness of the warp or weft of the fabric multiplied by the weave density of the fabric being less than 16000 decitex·end or pick, respectively, /2.54 cm, the fabric having the load at 15% elongation in the range of 3 to 35 N/%/2.54 cm and the tensile work at break in the range of 7000 to 30000 N·%/2.54 cm, and a value of fabric strength at break in a range from 740 to 1010 N/2.54 cm, the fabric being sewn or bonded to have a three dimensional contour.

3. An air bag as defined by claim 1 or 2, wherein the product of the fineness of weft multiplied by the weave density of weft is larger than the product of the fineness of warp multiplied by the weave density of warp.

4. An air bag as defined by claim 1 or 2, wherein the weft and warp forming the woven fabric each have a birefringence and the bireinfringence of the weft is larger than that of the warp.

5. An air bag as defined by claim 1 or 2, wherein the weave is selected from a plain weave, a rip-stop weave and a mat weave.

6. An air bag as defined by claim 1, wherein the bag-shaped air bag is of a circular shape as seen in plan view.

7. An air bag as defined by claim 1 or 2, wherein the yarns forming the woven fabric have a tensile strength in the range of 5.4 to 7.5 cN/decitex, and a tensile work at break in the range of 1.32 to 2.65 cN·cm/decitex.

8. An air bag as defined by claim 1 or 2, wherein the air bag is selected from those for a driver's seat, for a passenger's seat and for side impact protection.

9. An air bag comprising a woven fabric composed of polyamide fiber yarns containing a copper compound in a mixture of a halogenated alkali metal, the copper compound selected from a group consisting of a copper salt and a halogenated copper, and having a copper concentration in the range of 30 to 200 ppm, and the polyamide fiber yarns containing a plurality of single filaments, each filament having a fineness in the range of 1 to 3.3 decitex, the yarns having a yarn fineness in the range of 66 to 167 decitex, wherein the product of fineness of the warp or weft of the fabric multiplied by the weave density of the fabric being less than 16000 decitex·end or pick, respectively, /2.54 cm, the fabric having the load at 15% elongation in the range of 3 to 35 N/%/2.54 cm, the tensile work at break in the range of 7000 to 30000 N·%/2.54 cm, and a value of fabric strength at break in a range from 740 to 1010 N/2.54 cm.

10. An air bag as defined by claim 9 wherein the fabric is sewn or bonded to have a three-dimensional contour.

11. An air bag as defined by claim 9 wherein the air bag is formed of two woven fabrics interwoven with each other to be a bag-shaped body.

12. An air bag as defined by claim 10 or 11, wherein the product of the fineness of weft multiplied by the weave density of weft is larger than the product of the fineness of warp multiplied by the weave density of warp.

* * * * *